United States Patent
Page et al.

(10) Patent No.: US 7,556,219 B2
(45) Date of Patent: Jul. 7, 2009

(54) UNMANNED AERIAL VEHICLE AND LAUNCH ASSEMBLY

(75) Inventors: Mark A. Page, Cypress, CA (US); Doug McLarty, San Juan Capistrano, CA (US); Adrian Fazio, Lake Forest, CA (US); Christian Durand, Mission Viejo, CA (US); Bob Emerick, Murrieta, CA (US)

(73) Assignee: Swift Engineering, Inc., San Clemente, CA (US)

( * ) Notice: Subject to any disclaimer, the term of this patent is extended or adjusted under 35 U.S.C. 154(b) by 0 days.

(21) Appl. No.: 11/064,287

(22) Filed: Feb. 22, 2005

(65) Prior Publication Data

US 2009/0134273 A1 May 28, 2009

Related U.S. Application Data

(60) Provisional application No. 60/547,465, filed on Feb. 24, 2004.

(51) Int. Cl.
*B64F 1/04* (2006.01)
(52) U.S. Cl. .......................................... 244/63
(58) Field of Classification Search ................ 244/63, 244/137.1, 136, 149; 89/1.51, 1.59, 1.57; 446/63, 64, 59, 65; 102/351
See application file for complete search history.

(56) References Cited

U.S. PATENT DOCUMENTS

| | | | | |
|---|---|---|---|---|
| 3,138,352 A | * | 6/1964 | Saholt | 244/63 |
| 3,143,965 A | * | 8/1964 | La Pointe | 102/351 |
| 3,428,273 A | * | 2/1969 | Tyler | 244/63 |
| 3,517,584 A | * | 6/1970 | Robinson et al. | 89/1.51 |
| 4,004,764 A | * | 1/1977 | Burklund et al. | 244/149 |
| 4,553,718 A | * | 11/1985 | Pinson | 244/3.15 |
| 4,639,236 A | * | 1/1987 | McKay et al. | 446/430 |
| 4,844,380 A | * | 7/1989 | Peoples et al. | 244/3.22 |
| D314,366 S | | 2/1991 | Waaland et al. | |
| 5,082,204 A | | 1/1992 | Croston | |
| D382,851 S | | 8/1997 | Knutson et al. | |
| 5,695,153 A | * | 12/1997 | Britton et al. | 244/63 |
| 5,779,190 A | | 7/1998 | Rambo et al. | |
| 6,056,237 A | | 5/2000 | Woodland | |
| 6,179,680 B1 | * | 1/2001 | Hornsby et al. | 446/65 |
| 6,270,038 B1 | | 8/2001 | Cycon et al. | |

(Continued)

*Primary Examiner*—Tien Dinh
(74) *Attorney, Agent, or Firm*—Sheppard Mullin Richter & Hampton

(57) ABSTRACT

An unmanned aerial vehicle (UAV) is provided, that is cost effective to use and manufacture and that includes a low count of component parts, allowing mission planners to use the UAVs in a disposable manner. The UAV includes an airframe having a central body and wings extending from the central body, defining an interior cavity. The airframe includes an upper and a lower shell, each configured of a unitary piece of plastic. The upper and lower shells have walls among them that define a fuel tank and a payload bay in a stacked configuration. The airframe can further include a payload cover configured to enclose the payload bay and to contribute to the central body of the airframe. A launch assembly is also provided. In a first configuration, a launch assembly is provided, that includes a container for housing multiple UAVs and a deployment mechanism that initiates rapid ejection of the UAVs from the container. In a second configuration, a launch assembly is provided, that includes an elastic tether connecting a UAV to an accelerated mass for gentle acceleration to flight speed under a stable tow.

2 Claims, 15 Drawing Sheets

U.S. PATENT DOCUMENTS

| | | |
|---|---|---|
| 6,286,410 B1 * | 9/2001 | Leibolt ..................... 89/1.809 |
| 6,457,673 B1 | 10/2002 | Miller |
| 6,568,632 B2 | 5/2003 | Page et al. |
| 6,626,398 B1 | 9/2003 | Cox et al. |
| 6,752,060 B1 * | 6/2004 | Griffin ..................... 89/1.817 |

* cited by examiner

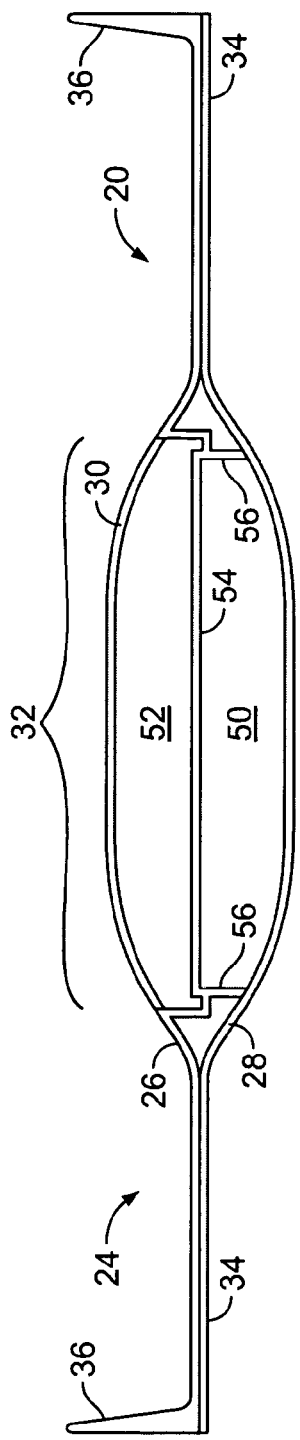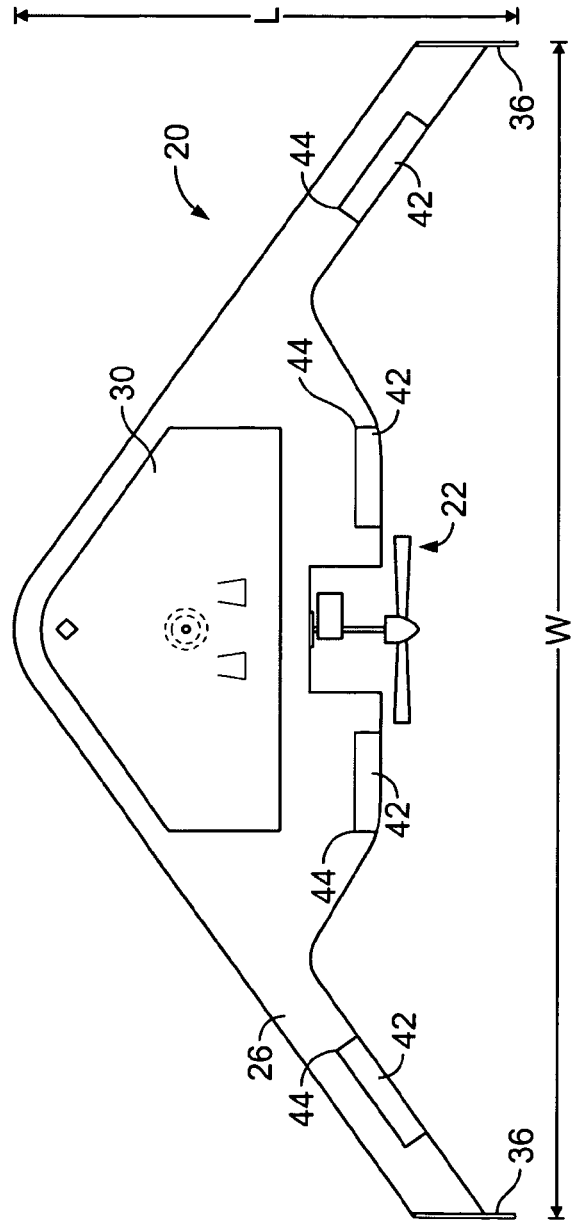

UNMANNED AERIAL VEHICLE AND LAUNCH ASSEMBLY

CROSS-REFERENCE TO RELATED APPLICATION

This application claims the benefit of U.S. Provisional Appl. No. 60/547,465, filed Feb. 24, 2004, which is herein incorporated by reference.

BACKGROUND OF THE INVENTION

The present invention relates generally to unmanned aerial vehicles (UAVs) and, more particularly, to UAVs having a cost-effective configuration. The present invention also relates to launching systems for UAVs.

UAVs have become increasingly popular in many situations, including surveillance and strike missions. The traditional approach for UAVs has been to develop a robust, centralized system, incorporating sophisticated payload on a relatively large airframe. Such UAVs typically include multipart wings, control surfaces, and a multi-part fuselage, requiring precise fittings of many joints, making them inherently costly to manufacture and assemble. One example is the Predator, made by General Atomics Aeronautical Systems, Inc., of San Diego, Calif.

These traditional UAVs follow a conventional launch sequence, requiring a runway surface. Due to take-off and landing requirements, such traditional UAVs typically must operate from a relatively built-up facility. In a combat environment, such facilities typically are far removed from forward-deployed troops. Current approaches for tactical support of these troops typically call for continuous overhead coverage. However, due in part to the relative high cost for each UAV, this loitering mission is typically performed by a single UAV, or a limited number of UAVs. Extended loitering of these relatively large UAVs make them relatively easy for the enemy to target. If the enemy successfully strikes a limited number of UAVs, tactical surveillance can be compromised and, due in part to deployment constraints of the UAV, there can be a relatively long delay before reconstitution.

More recently, UAVs have been configured for deployment from facilities without built-up runways. Rockets are commonly used for this purpose, since they can rapidly accelerate the UAV, thereby reducing, or eliminating, horizontal take-off launch requirements. However, the UAV must be configured to endure the stresses resulting from such acceleration, requiring added structural weight and reducing overall mission performance. Moreover, rocket motors must be maintained and transported with the launcher, increasing associated costs.

It should, therefore, be appreciated that there exists a need for an unmanned aerial vehicle for use in a variety applications that is cost-effective to use and manufacture. There also exists a need for a system for launching unmanned aerial vehicles without need of extensive facilitates or runways. The present invention fulfills this need and others.

SUMMARY OF THE INVENTION

Briefly, and in general terms, the invention provides an unmanned aerial vehicle (UAV) that is cost effective to use and manufacture. The UAV includes an airframe assembly having a low count of component parts, thereby contributing to overall cost-effectiveness. The UAV is reusable and can carry a variety of payloads, making it highly adaptable for use in a variety of applications, including military and civilian applications. Nonetheless, the UAV can be fabricated at sufficiently low cost, allowing mission planners to use the UAVs in a disposable manner. Moreover, many of the UAVs can be packaged in a single container for convenient storage, transportation and rapid deployment, further promoting the versatility of the system.

More specifically, and by way of example only, the UAV includes conforming shells, e.g., a lower shell, an upper shell and a payload cover, that combine to form the airframe. The lower and upper shells mate such that interior walls define a fuel tank and a payload bay within the airframe. Thus, separate structures are not needed to form the fuel tank and the payload bay. Rather, they are formed coincident with the airframe, contributing to ease of assembly and other cost savings. Due in part to the configuration of the components, e.g., the payload cover, the upper shell and the lower shell, inexpensive molding process can be used. For example, they can be formed in shallow one-piece molds suitable for composite lay-up, vacuforming, or blow-molding, or other economical high-production techniques.

In an exemplary embodiment of the invention, the UAV includes an airframe having a central body and wings extending from the central body, defining an interior cavity. The airframe includes an upper and a lower shell, each configured of a unitary piece of plastic. The upper and lower shells have walls among them that define a fuel tank and a payload bay in a stacked configuration within the interior cavity of the airframe. The airframe can further include a payload cover configured to enclose the payload bay and to contribute to the central body of the airframe.

In a detailed aspect of an exemplary embodiment, the walls of the upper and lower shells include a common wall disposed between the fuel tank and the payload bay and side walls that extend about the periphery of the common wall to help define the fuel tank.

The UAV preferably includes control surfaces at prescribed locations to provide responsive flight control. Control surfaces can be formed by lines of weakening in the airframe, thereby maintaining a low component count. In other embodiments, rather than rotating about lines of weakening, control surfaces can be formed by detaching, e.g., cutting, the control surfaces from the airframe and remounting them at their prescribed locations. In yet other embodiments, the control surfaces can be provided by separate structures.

The UAV is preferably configured for powered flight, for which various types of engines can be used, such as, fuel-powered, battery-powered and solar-powered. In an exemplary embodiment, an engine is located along the primary axis of the aircraft at a center-aft location and attached to the airframe at engine mounts. The engine mounts can be integrally molded with the airframe assembly. The engine also can include an elongated axis between the engine motor and the propeller, allowing each to be positioned in spaced locations about the aircraft. For example, the motor can be located in the rear of the aircraft and configured to drive a front-mounted propeller. In yet other embodiments, the engine motor and the propeller can be front-mounted.

In an exemplary embodiment, the UAV is configured as a blended-wing body, having a central body region and wings, all contributing to the aerodynamic lift of the UAV. Other airframe configurations can be used, including blended-wing/fuselage configurations and aero-diamond configurations, particularly if configured with a low count of component parts. Nonetheless, other embodiments can have a higher component count than the exemplary embodiment without departing from the invention.

In a detailed aspect of an exemplary embodiment, the fuel tank and the payload bay are co-located within the central body region of the airframe in a stacked configuration, sharing a common wall. As a result, the center of gravity the fuel tank can be aligned with the center of gravity of the payload. Side walls extend about the periphery of the common wall to help define the fuel tank. The common wall and the side walls of the fuel tank can be defined by one or more of the airframe components. In other embodiments, the fuel tank and the payload bay can be defined by separate structure located within the central body region of the airframe, as desired.

Systems and methods of conveniently storing and rapidly deploying UAVs are also provided. In an independent aspect of the invention, multiple UAVs are stored in a single container. The container includes a container body having an opening and a removable lid covering the opening. The container can further include alignment supports, such as a conformed liner, that facilitates proper positioning of the UAVs within the container. The container may further include a deployment mechanism that initiates rapid ejection of the UAVs from the container. Thus, the container can serve as both a storage container and a launch platform.

In a detailed aspect of an exemplary embodiment, the container includes ejection charges and a piston located at a second end thereof to facilitate rapid deployment of the UAVs. The piston is disposed between the ejection charges and the aircraft. Upon ignition of the ejection charges, the piston drives outward toward the opening of the container causing the lid to open and the entirety of the UAVs to eject from the container. In this manner, the entire contents of the container can be rapidly deployed.

In another independent aspect of the invention, a launcher is provided that deploys a UAV without need of a runway or excessive acceleration. The launcher is compact and easy to use. In an exemplary embodiment, the launcher includes an elastic tether connecting the UAV to an accelerated mass, e.g., a shell. Various approaches can be used to accelerate the shell. In an exemplary embodiment, the shell is discharged from a closed volume via a pressurized gas or ignition of a combustible fuel. For example, aviation, marine or automotive fuel can be used, facilitating ease of use for forward deployed troops since such fuels are readily accessible. In use, the shell is rapidly accelerated, uncoiling the tether attached thereto. Once the tether is fully tensioned, the UAV accelerates away from the launcher. Stretching of the tether delivers a gentle acceleration to the vehicle over a distance. As the UAV picks up energy, the shell loses energy, decelerates, and the tether slackens. Once the tether is slacked, the tether detaches from the vehicle.

In another exemplary embodiment, motive force can be imparted to the shell using a spring assembly. The spring assembly can be used to thrust the shell out of the housing, or can be used in place of the shell.

In a detailed aspect of an exemplary embodiment, the spring assembly includes a central rod attached to a first side wall and extending a helical spring. To compress the spring, the rod extends through an opening in a second side wall and is held in place via wedges spaced about the opening. The wedges hold an enlarged end of the rod. A ring is disposed around the outside of the wedges. When the ring is removed, the wedges rotate, releasing the center rod. The tether can be attached through two holes in an intermediate support connected to the central rod. The spring assembly can be scaled to suit the aircraft requirements.

In yet other embodiments, the mass can be accelerated using other approaches, e.g., grenade launchers, flare launchers, compound bows, and other means capable of generating sufficient force for particular requirements. The launcher can be scaled to suit the launch parameters. For example, mass size, mass velocity, elastic tether length and elastic tether spring-rate are set at prescribed values, based upon specific needs. Done properly, the vehicle is gently accelerated to flight speed under a stable tow.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which:

FIG. 2 is a front cross-sectional view of the UAV of FIG. 1.

FIG. 3 is a plan view of the UAV of FIG. 1.

DETAILED DESCRIPTION OF THE PREFERRED EMBODIMENTS

Figure 1:
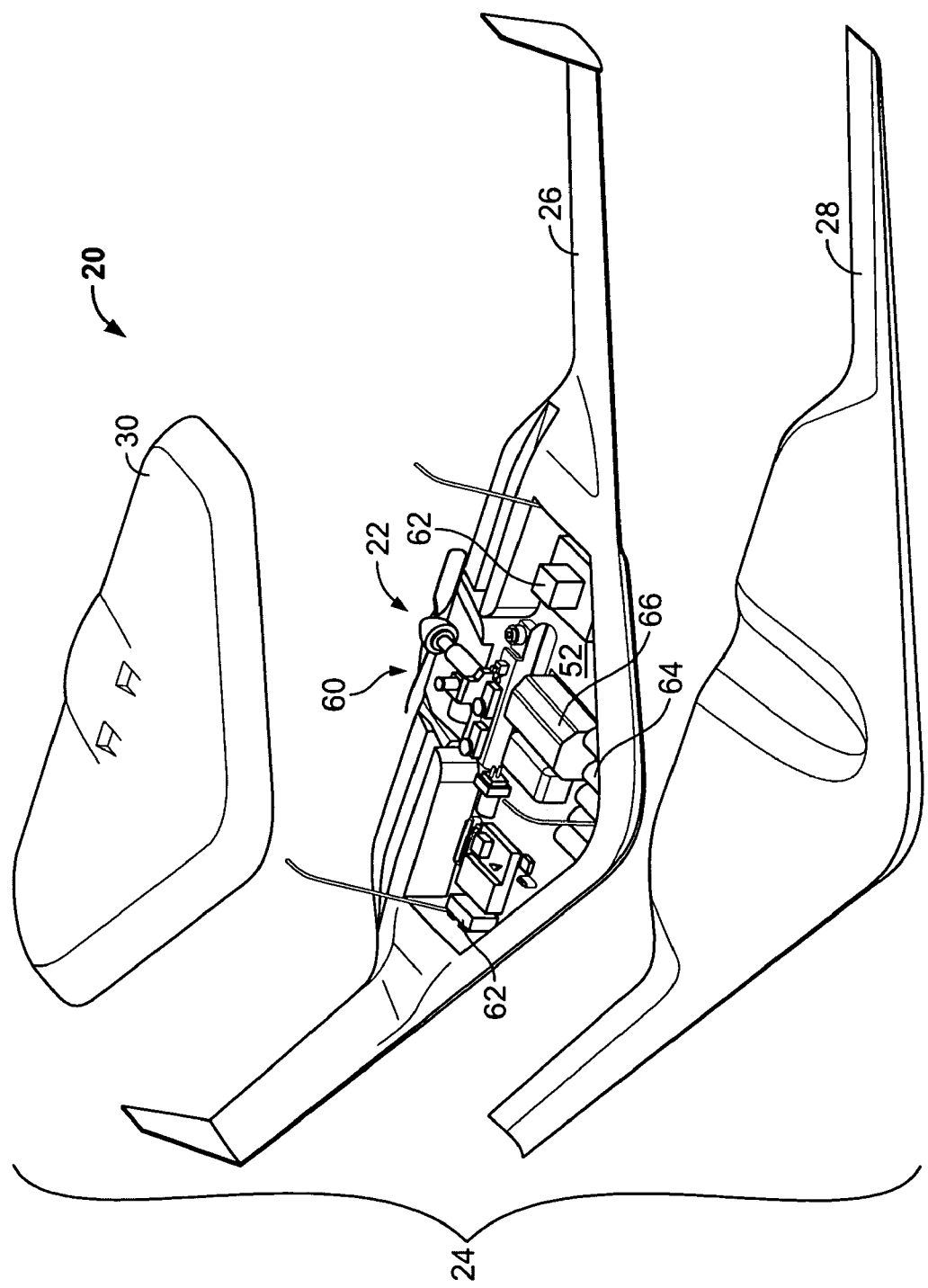
FIG. 1 is an exploded front perspective view an unmanned aerial vehicle (UAV) in accordance with the present invention, depicting a lower shell, an upper shell and a payload cover.
Figure 4:
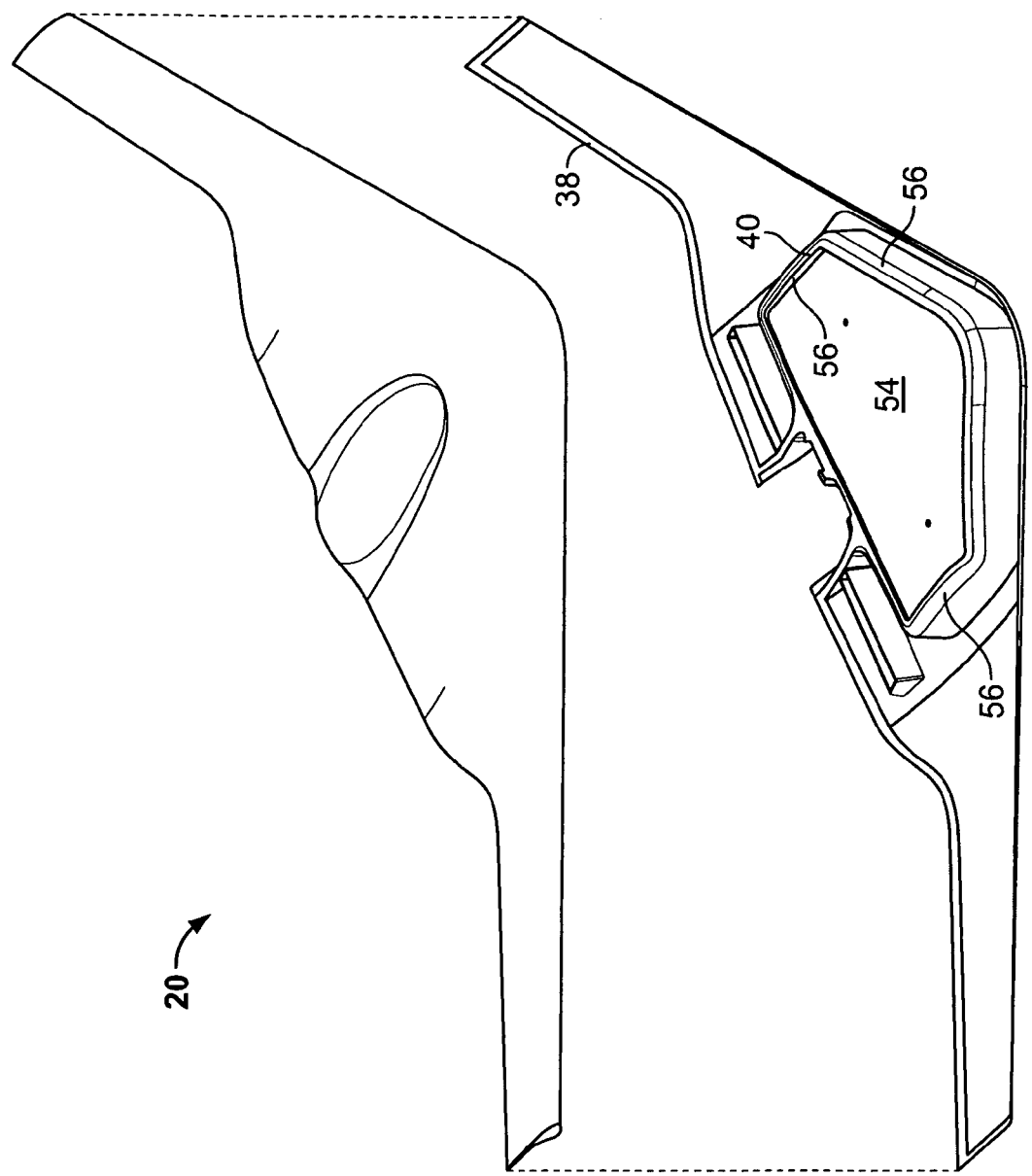
FIG. 4 is a cross-sectional view of the UAV of FIG. 1.

With reference to the illustrative drawings, and particularly to FIG. 1, there is shown an unmanned aerial vehicle (UAV) system 20 having a rear-mounted engine 22 mounted to an airframe assembly 24. The UAV is reusable and can carry a variety of payloads, making it highly adaptable for use in a variety of applications, including military and civilian applications. Beneficially, the airframe assembly of the exemplary embodiment has just three primary components formed of molded plastic, contributing to overall cost effectiveness. Since replacement costs are so low, mission planners can use the UAVs in a disposable manner. Moreover, many UAVs can be packaged in a single container for convenient storage, transportation and rapid deployment, further promoting the versatility of the system.

The component parts of the airframe 24 include an upper shell 26, a lower shell 28, and a payload cover 30, forming a blended-wing body. The airframe has a central body region 32 and wings 34, both of which contribute to the aerodynamic lift of the UAV. The wings terminate in winglets 36 that also contribute to aerodynamic characteristics of the UAV. In exemplary embodiment, the winglets are canted about 90 degrees, but can be varied in other embodiments, or excluded entirely. Also, the UAV 20 has a wingspan (W) of about six feet and a length (L) of about 2.7 feet (FIG. 3). The overall area of the wing is approximately 12.5 square feet, and the wings are swept at about 35 degrees. Each winglet has a height of approximately four inches. Of course, size and configuration of airframes can be varied, as requirements dictate. For example, larger airframes can be provided for additional payload capacity. Also, other airframe configurations can be used, including various other blended-wing/fuselage configurations and aero-diamond configurations, particularly if configured with a low count of component parts. Nonetheless, other embodiments can have a higher component count than the exemplary embodiment without departing from the invention. For example, the wings can be separate components.

The upper and lower shells 26, 28 both have concave sides that mate with each other to generally define the internal volume of the airframe. The shells are affixed to each other along interface surfaces that align with each other to facilitate secure attachment. The interface surfaces include peripheral surfaces 38 that extend around the periphery of the shells as well as along interior surfaces 40 along interior walls of the airframe. Once mated, the shells generally define the UAV's silhouette, including the central body region and the wings. Thus, assembly of the airframe is a simple process, free of complex joints. Due in part to the shapes of the components, i.e., the payload cover, upper shell and lower shell, inexpensive molding process can be used. For example, they can be formed in shallow one-piece molds suitable for composite lay-up, vacuforming, blow-molding, or other economical high-production techniques. However, other materials can be used, as desired.

The UAV 20 further includes control surfaces 42 integrally formed with the upper and lower shells 26, 28. The arrangement of the control surfaces, including size, orientation and range of motion, are configured, as is known in art, to provide responsive flight control. In the exemplary embodiment, the control surfaces are defined by lines of weakening 44, e.g., thinned portion of material and/or a softer material, in prescribed locations about the airframe. Thus, the control surfaces can be integral with the upper and lower shells, without increasing the component count. Rather than rotating about lines of weakening, control surfaces can be formed by detaching, e.g., cutting, the control surfaces from the airframe and remounting them at their prescribed locations. Actuators are used to manipulate the control surfaces during flight. In other embodiments, the control surfaces can be formed from separate structure.

Figure 5:
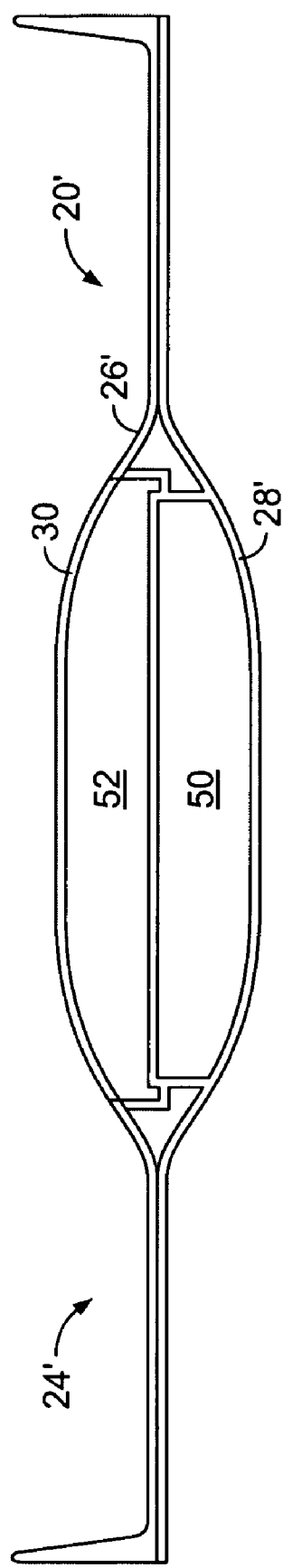
FIG. 5 is a cross-sectional view of a second embodiment of a UAV in accordance with the invention.

Interior walls of the shells 26, 28 are used to define both a fuel tank 50 and a payload bay 52. Thus, separate structures are not needed to form the fuel tank and the payload bay. Rather, they are formed coincident with the airframe, contributing to ease of assembly and other cost savings. The interior walls can also serve as stiffeners for the airframe, contributing to aircraft performance. In the exemplary embodiment, the fuel tank and the payload bay are co-located within the central body region 32 of the airframe in a stacked configuration, sharing a common wall 54. As a result, the center of gravity the fuel tank can be aligned with the center of gravity of the payload. As best seen in FIG. 3, the fuel tank is disposed directly below the payload bay. Thus, the common wall serves as a floor for the payload bay and as the ceiling of the fuel tank. Side walls 56 extend from generally around the periphery of the common wall to help define the fuel tank. The side walls define interface surfaces 58 that mate with corresponding surfaces on the lower shell. In this embodiment, the common wall and the sides walls of the fuel tank are defined by the upper shell. However, in other embodiments, these walls can be defined in part, or exclusively, by the lower shell (e.g., FIG. 5). In other embodiments, the fuel tank and the payload bay can be defined by separate structures located within the central body region of the airframe.

In the central body region, the upper shell 26 mates with the payload cover 30 to enclose the payload bay 52. In the exemplary embodiment, the payload bay has an average depth of about 2.3 inches, a payload floor area of about 256 square inches, and a volume of about 590 cubic inches. The payload cover provides easy access to the payload bay, facilitating optimal positioning of the payload and ease of switching payloads. The upper shell also defines mounting structure within the payload bay to facilitate easy and secure attachment of the payload subassembly. Various payloads can be deployed in the bay, depending upon mission requirements. In the exemplary embodiment, a payload subassembly 60 includes a communication system 62 that enables commanding from remote operators as well as communication among several UAVs. Also, batteries 64 are mounted adjacent to the nose of the aircraft, and a process/mission sensor 66 mounted in the center of the payload bay.

The gas engine 22 located along the primary axis of the aircraft 20 at a center-aft location. The engine is attached to the airframe at engine mounts, integrally molded with the upper shell. In other embodiments, the engine motor and propeller can be front-mounted. The engine also can include an elongated axis between the engine motor and the propeller, allowing each to be positioned in spaced locations about the aircraft. For example, the motor can be located in the rear of the aircraft and configured to drive a front-mounted propeller. In this embodiment, the propeller of the engine is approximately 10 inches in diameter and each prop has a pitch of about eight inches. The overall engine has a width of about three inches and a length of about four inches. Moreover, the engine is lightweight; weighing is approximately 2.75 pounds, of which the propeller accounts for about 1.75 pounds. Various other engine types can be used, e.g., fuel-powered, battery-powered and solar-powered. In embodiments excluding a fuel-powered engine, the center body region of the UAV can exclude a fuel tank; instead, it can be configured to accommodate the payload and components required for the particular engine type.

In the exemplary embodiment, the fuel tank 50 is about 55 cubic inches. Fully fueled, the UAV 20 has a max gross weight of about ten pounds. The airframe 24 accounts for approximately three pounds of the gross weight. With additional subassemblies attached, excluding fuel and payload, the UAV has a dry weight of about 8.5 pounds. The fuel of the aircraft accounts for approximately 15 percent of the total weight. Since fuel constitutes a substantial portion of the gross take off weight, the fuel tank configuration has a significant effect on flight performance. For stability, the center of gravity (CG) preferably is at or forward of the aerodynamic center throughout.

Figure 6:
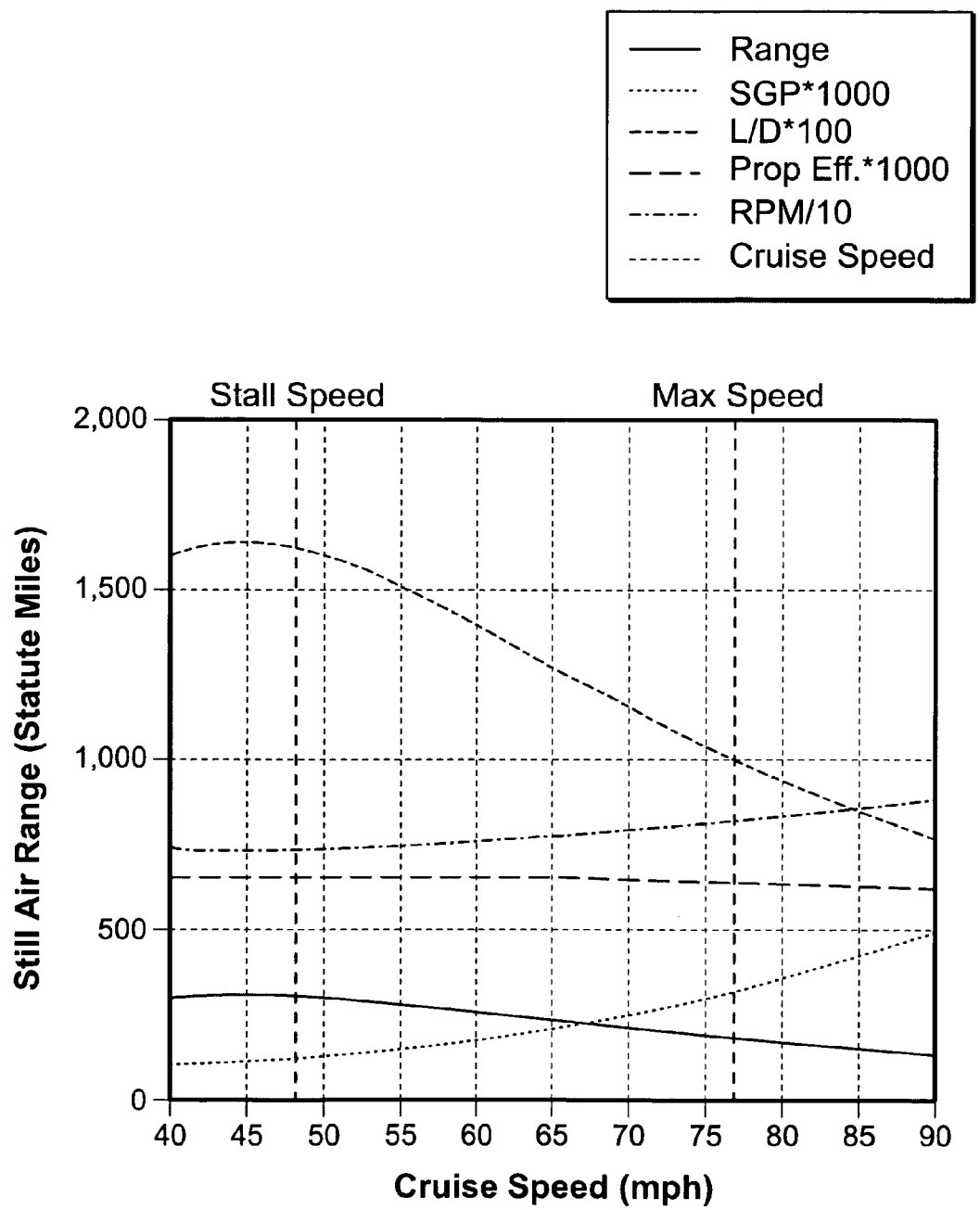
FIG. 6 is a graph of performance characteristics of the UAV of FIG. 1, depicting cruise speed versus air range (miles) trade-offs.

With reference now to FIG. 6, a graph depicting cruise speed versus still air range trade-offs of the UAV 20 is shown, for a cruise altitude of about 3,600 feet. Dashed line "A" depicts a level-flight stall speed of the UAV. Dashed line "B" depicts a maximum velocity at level flight. In this example, the stall speed is about 39 miles per hour and the maximum velocity of about 77 miles per hour. Solid line "C" graphs the still air range of the UAV at various speeds. The UAV preferably cruises at a speed of about 48 miles per hour. At that speed, the UAV can remain airborne for over six hours. Other embodiments can be configured for significantly greater flight endurance, as needed to satisfy mission requirements. For example, UAVs having fuel-powered engines, the fuel tank can be sized to accommodate endurance requirement. Also, for UAV having other engine types, e.g., solar-powered or battery-powered, components can be sized to accommodate requirements.

Figure 7:
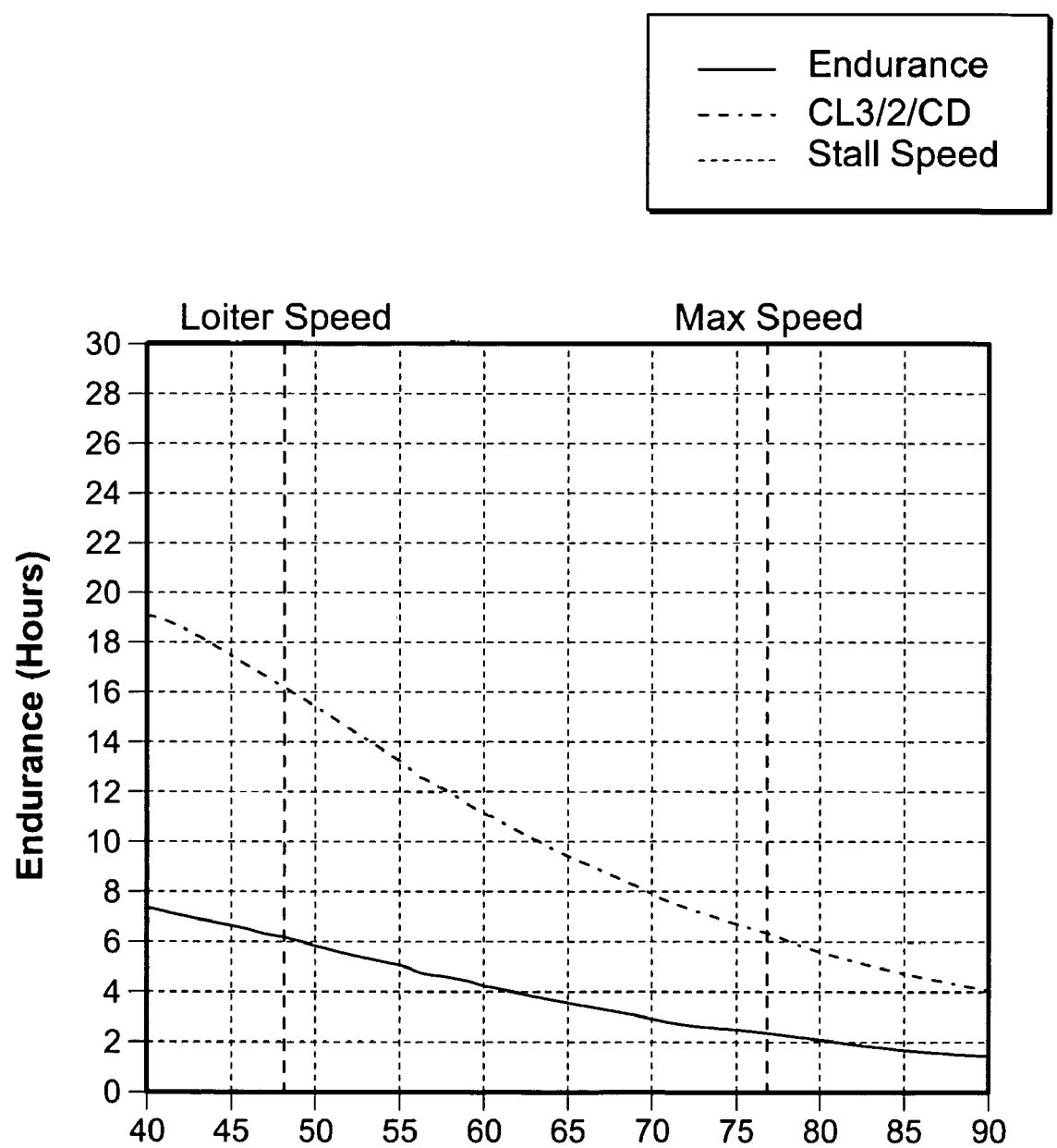
FIG. 7 is a graph of performance characteristics of the UAV of FIG. 1, depicting cruise speed versus endurance (hours) trade-offs.

With reference to FIG. 7, a graph depicting cruise speed versus endurance trade-offs for UAV 20 is shown. Dashed line "A" depicts a level-flight loiter speed of the UAV. Dashed line "B" depicts a maximum velocity at level flight. As depicted in the graph, at a loiter speed of about 47 mph, the UAV has an endurance of over six hours. As speed increases, endurance of the aircraft decreases. The UAV has endurance between about two and three hours, at maximum speed. Other embodiments of UAVs can be provided having other performance characteristics suited for particular missions. For example, certain UAVs can be configured for maximum endurance, while others are configured to maximize aircraft speed.

Figure 8:
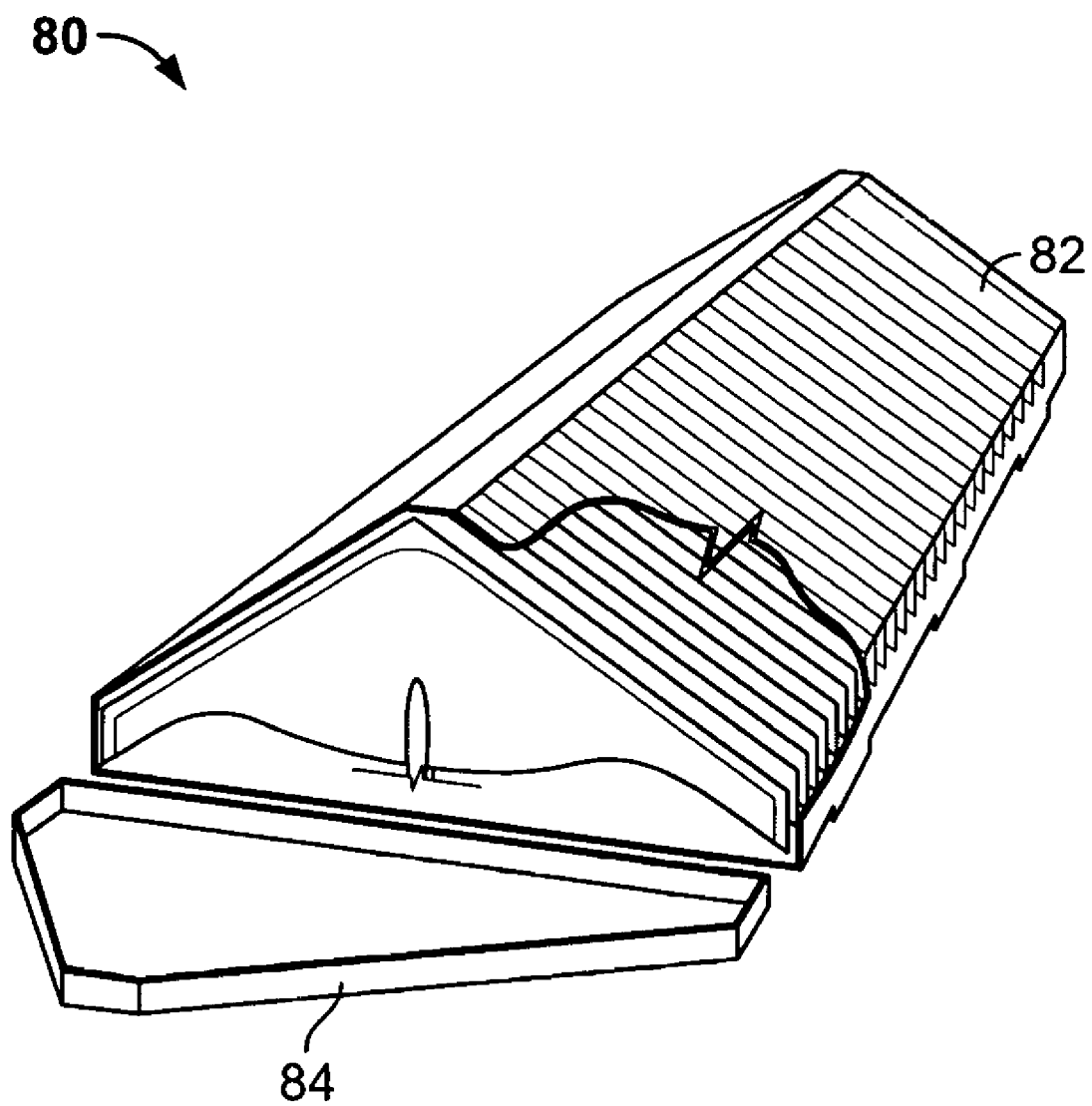
FIG. 8 is a perspective view of a container in accordance with the invention, housing a number of UAVs.
Figure 9A:
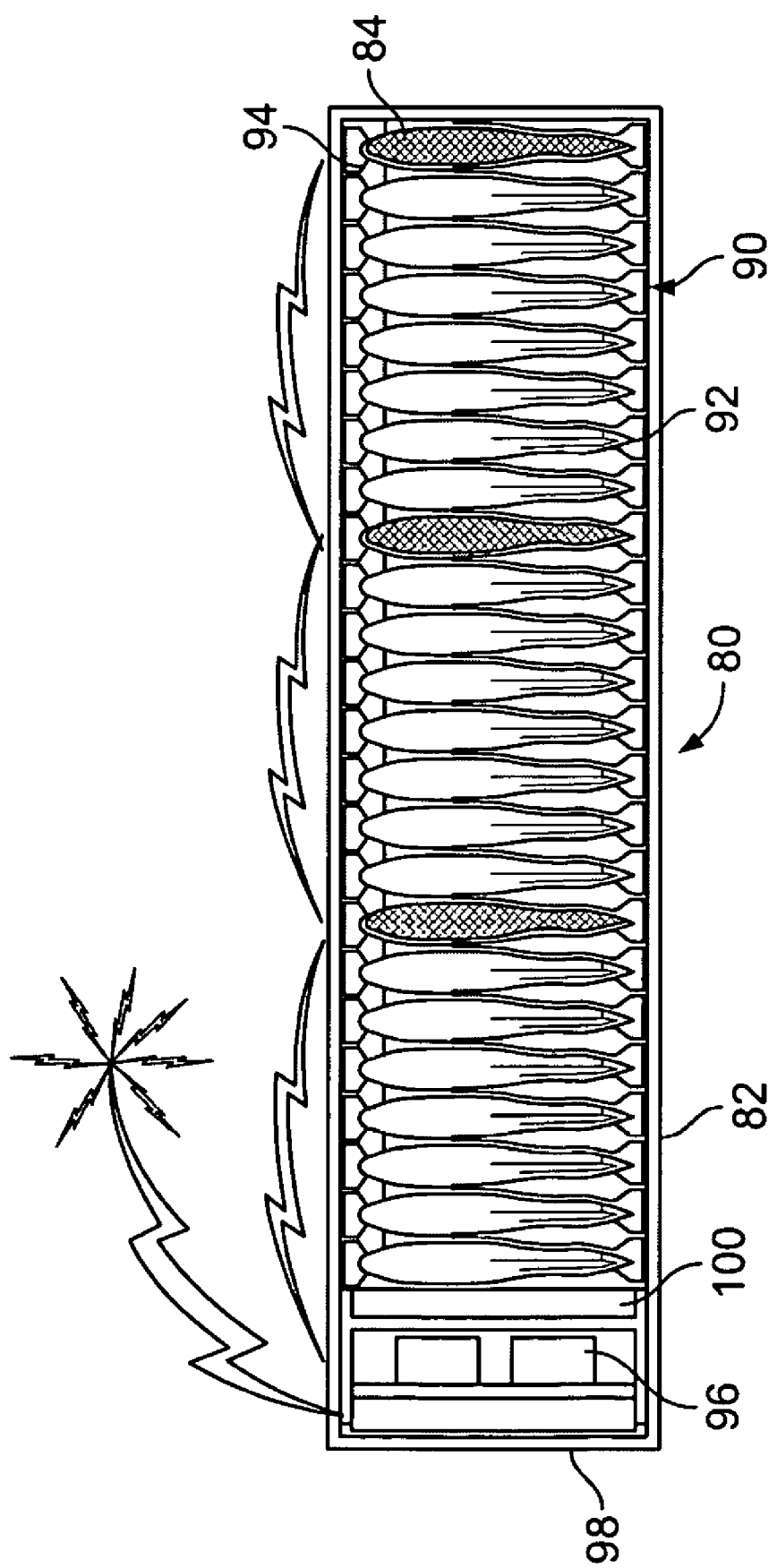
FIGS. 9A-9D are side views of the UAVs and container of FIG. 8, with a side wall of the container removed, sequentially depicting rapid deployment of the UAVs from the container.
Figure 9B:
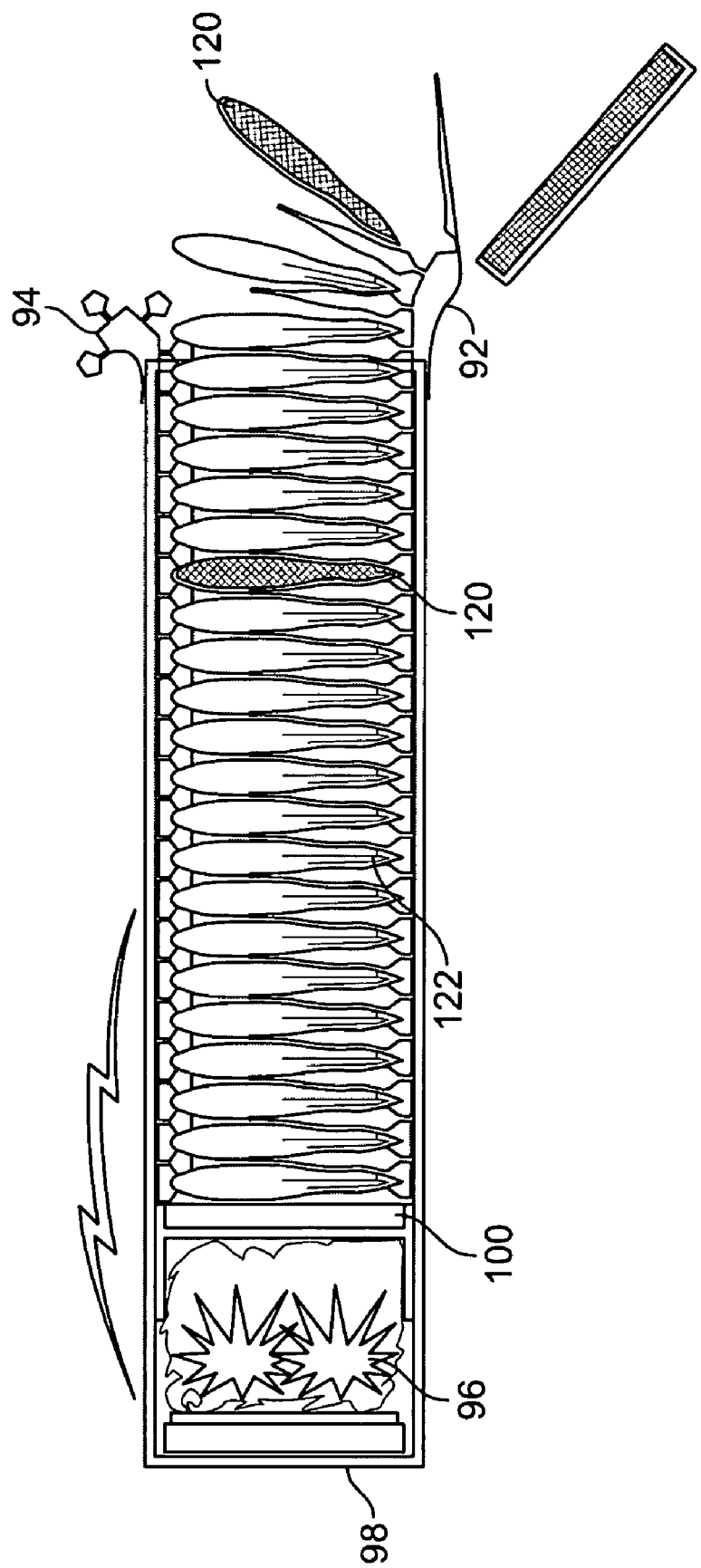
Figure 9C:
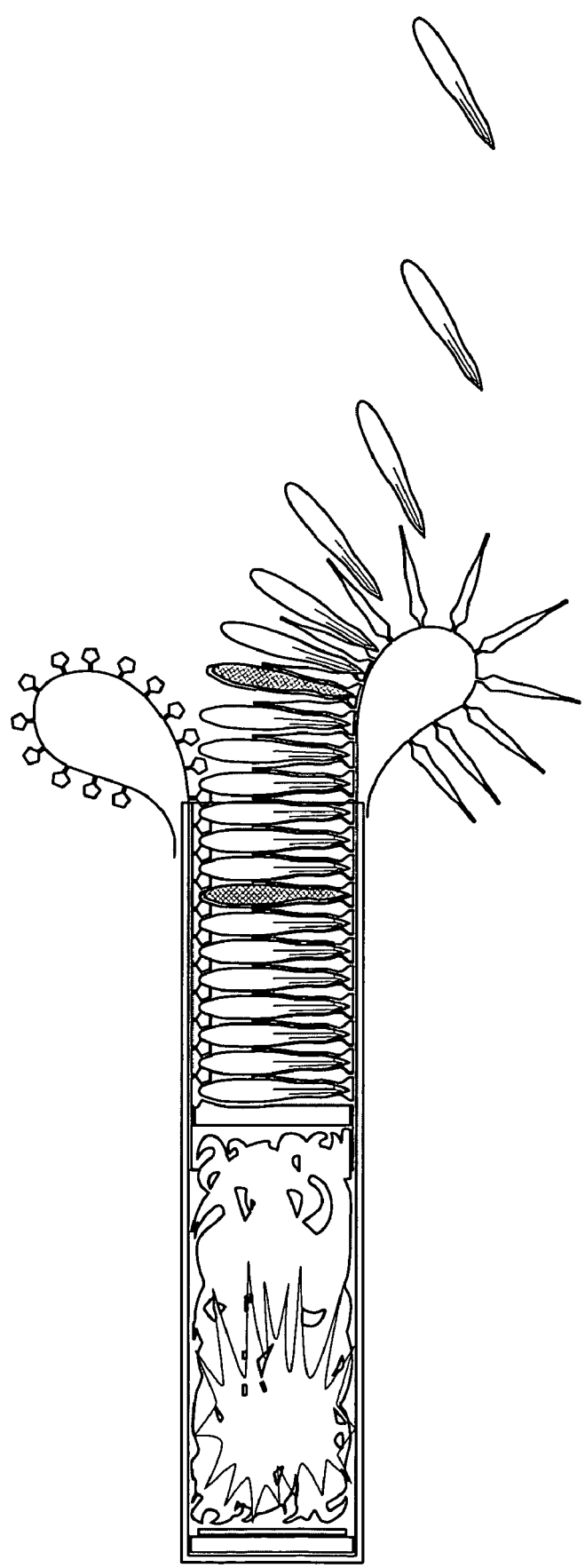
Figure 9D:
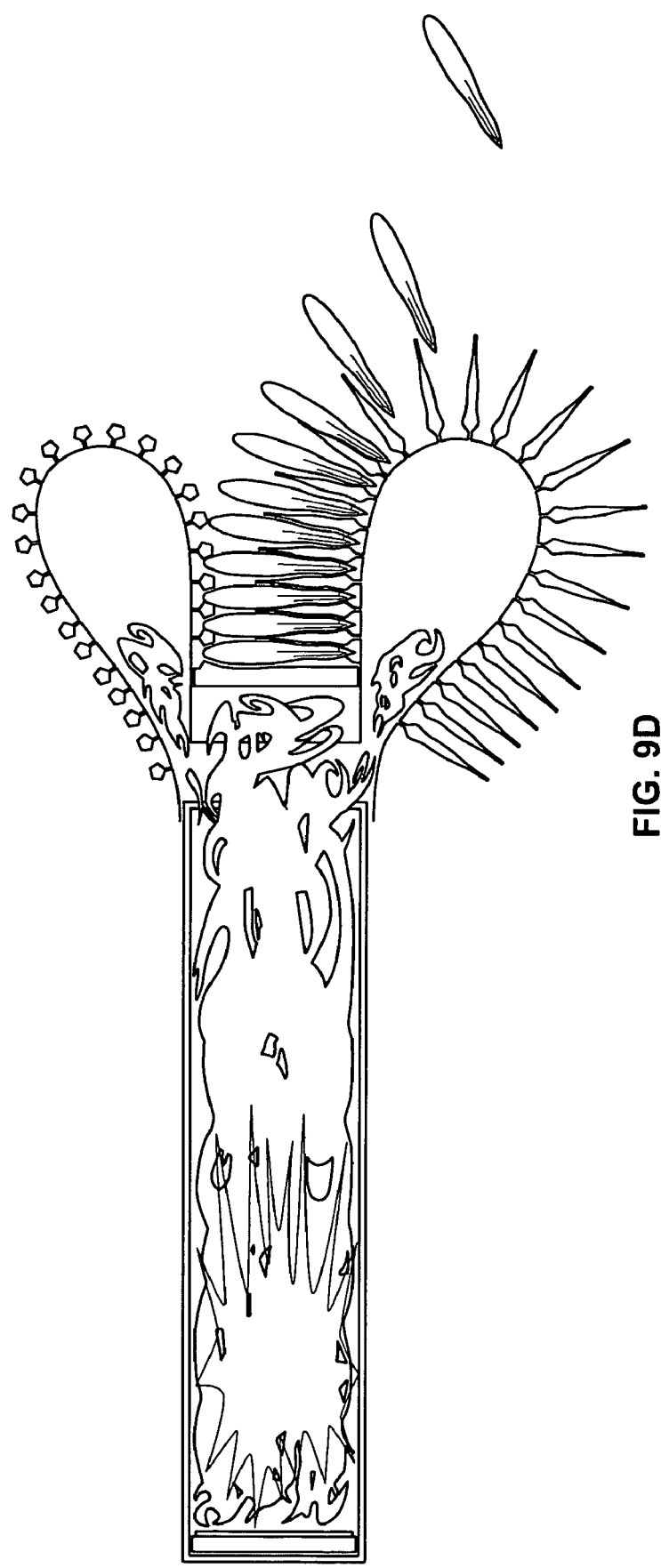
Figure 10:
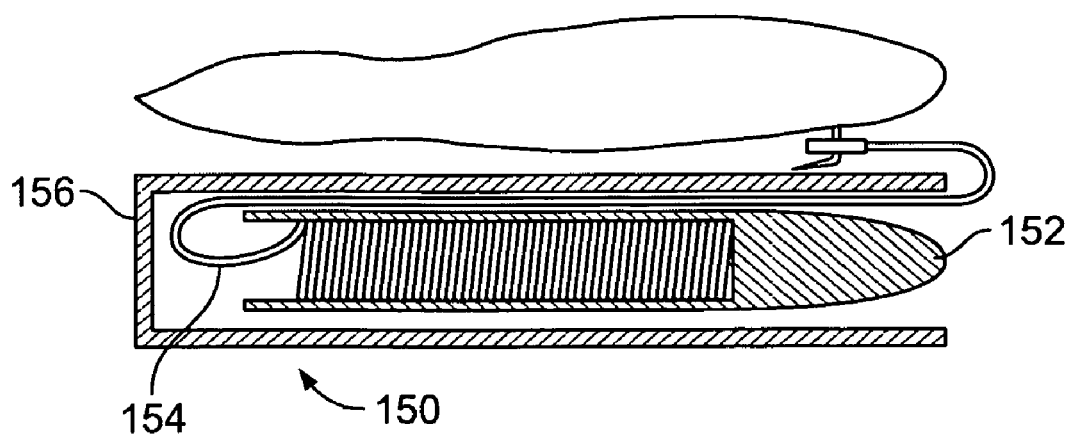
FIG. 10 is a side view of a UAV launcher in accordance with the invention, depicting a UAV positioned atop the launcher.
Figure 11A:
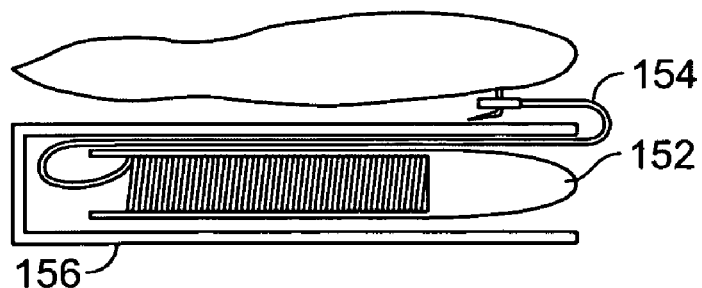
FIGS. 11A-11F are side views of the launcher and UAV of FIG. 10, sequentially depicting deployment of the UAV.
Figure 11B:
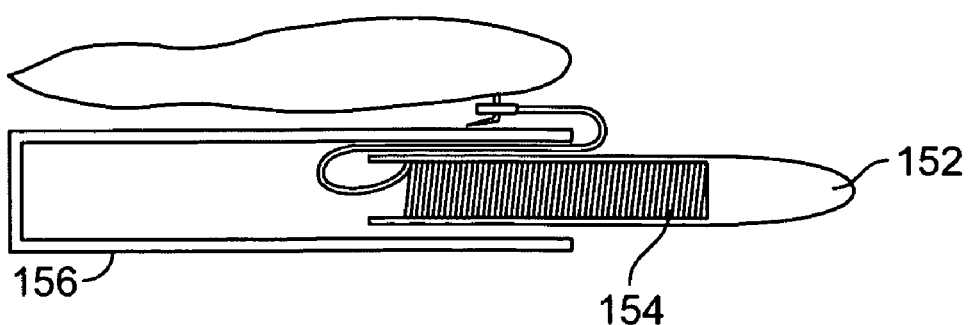
Figure 11C:
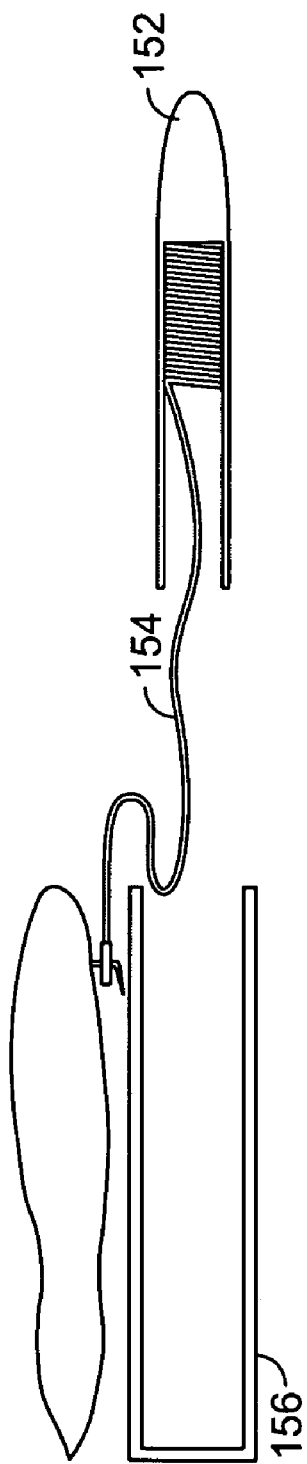
Figure 11D:
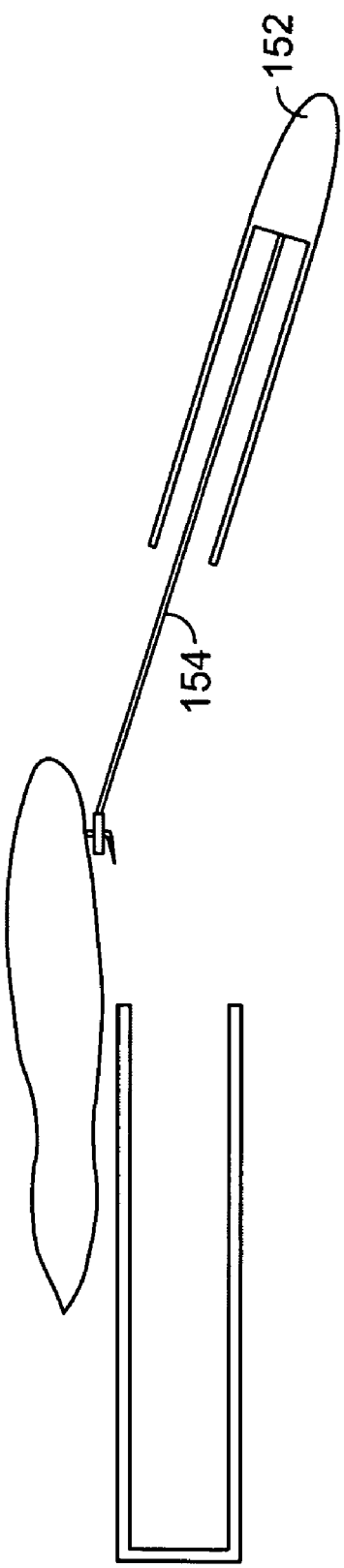
Figure 11E:
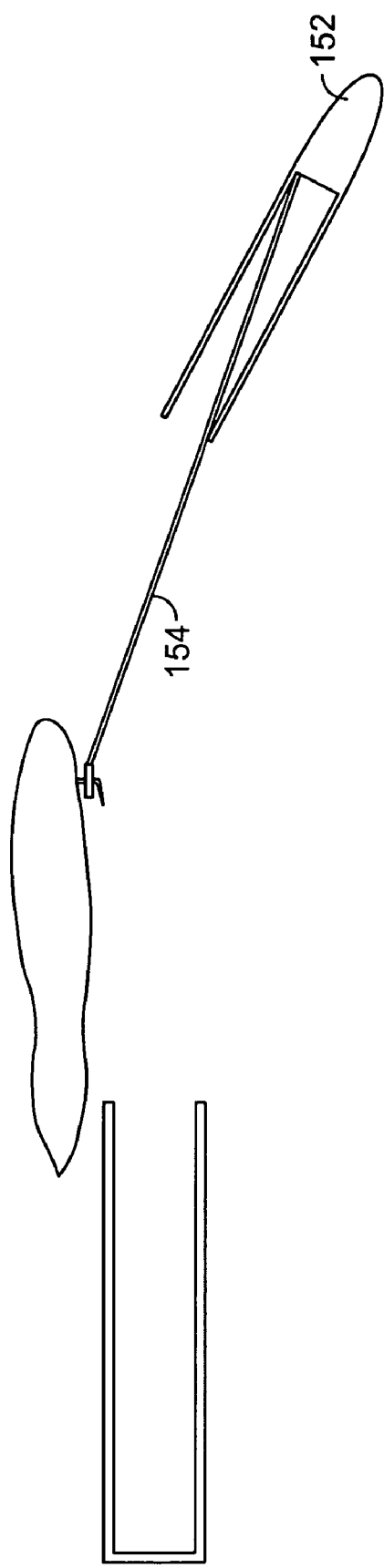
Figure 11F:
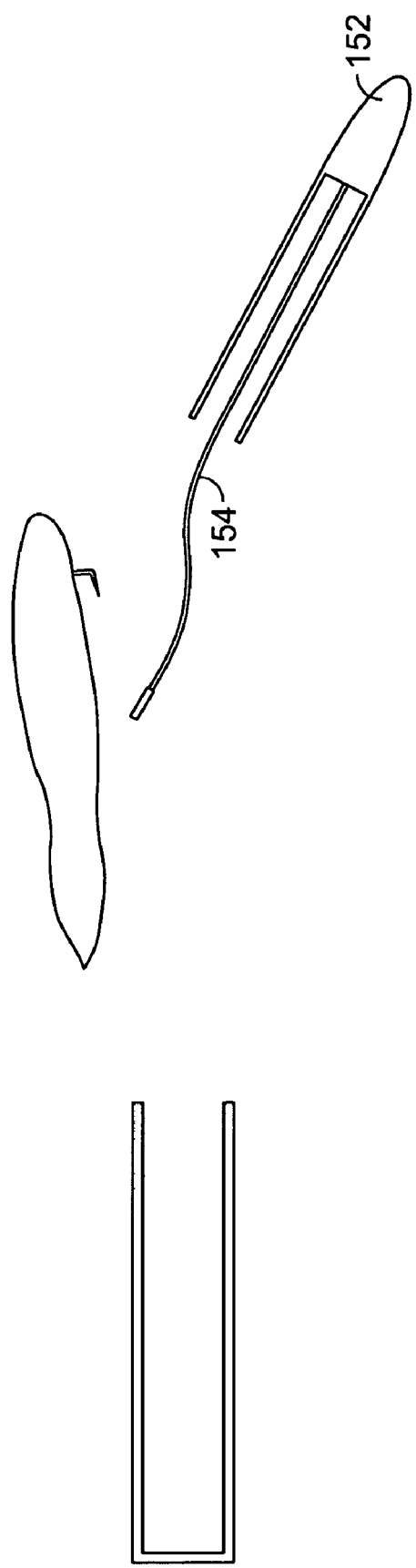

With reference now to FIG. 8, multiple UAVs housed and transported to a launch site in a single container 80. In the exemplary embodiment, approximately twenty-five UAVs are housed in the container. The container comprises a container body 82 and a lid 84. The lid encloses an opening 86 of the container body. The UAVs are aligned in a generally nose-up configuration extending between side walls 88 of the container. The container further includes an orientation mechanism 90 that extends substantially the entire length of the container (FIG. 9A). The mechanism is used to space and orient the UAVs within the container. In the exemplary embodiment, the mechanism includes lower and upper liners 92, 94, both having projections that help support the UAVs.

The UAVs can be deployed in a "swarm" over a target of interest, providing a number of sensors having different viewpoints of the target. The container 80 includes ejection charges 96 located at a second end 98 and a piston 100, to facilitate rapid deployment of the UAVs. The piston is disposed between the ejection charges and the aircraft. Upon ignition of the ejection charges, the piston drives outward toward the opening of the container causing the lid to open and the entirety of the UAVs to eject from the container. In this manner, the entire contents of the container, namely all twenty-five UAVs, can be rapidly deployed for service.

A selected number of the UAVs can be configured with additional command and control components. These command UAVs 120 can send instruction to the remaining drone UAVs 122, commanding them to perform any particular mission assigned. For example, the command UAV can include GPS navigation functionality as well as terrain mapping functionality. Using these features command aircraft can guide the drone UAVs to the target destination. The drone UAV can be equipped with a variety of different payloads, e.g., optical sensors, infrared sensors, electromagnetic sensors, or explosives. Of course, the payload configuration is dependent upon mission requirements. Once at the target, the UAVs can loiter for many hours. This loiter capability provides combat commanders with a real-time capability to respond to threats as they occur. The command UAVs maintain communication with the drone UAVs. In addition, the UAVs are relatively small and quiet thereby enhancing their ability to loiter above the target without detection.

With reference now to FIGS. 10 and 11A-11F, a launcher 150 can be used to deploy a UAV without need of a runway or excess acceleration. The launcher includes a shell 152 and an elastic tether 154, e.g., bungee cord, connecting the shell and the UAV. Various approaches can be used to accelerate the shell, e.g., grenade launchers, flare launchers, compound bows and other means capable of generating sufficient force for particular requirements. The launcher can be scaled to suit the launch parameters. For example, mass size, mass velocity, elastic tether length and elastic tether spring-rate are set at prescribed values, based upon specific needs. Done properly, the vehicle is gently accelerated to flight speed under a stable tow. In an exemplary embodiment, the shell is disposed in a housing 156 and discharged via a pressurized gas or ignition of a combustible fuel. For example, aviation, marine or automotive fuel can be used, facilitating ease of use for forward-deployed troops since such fuels are readily accessible.

Figure 12:
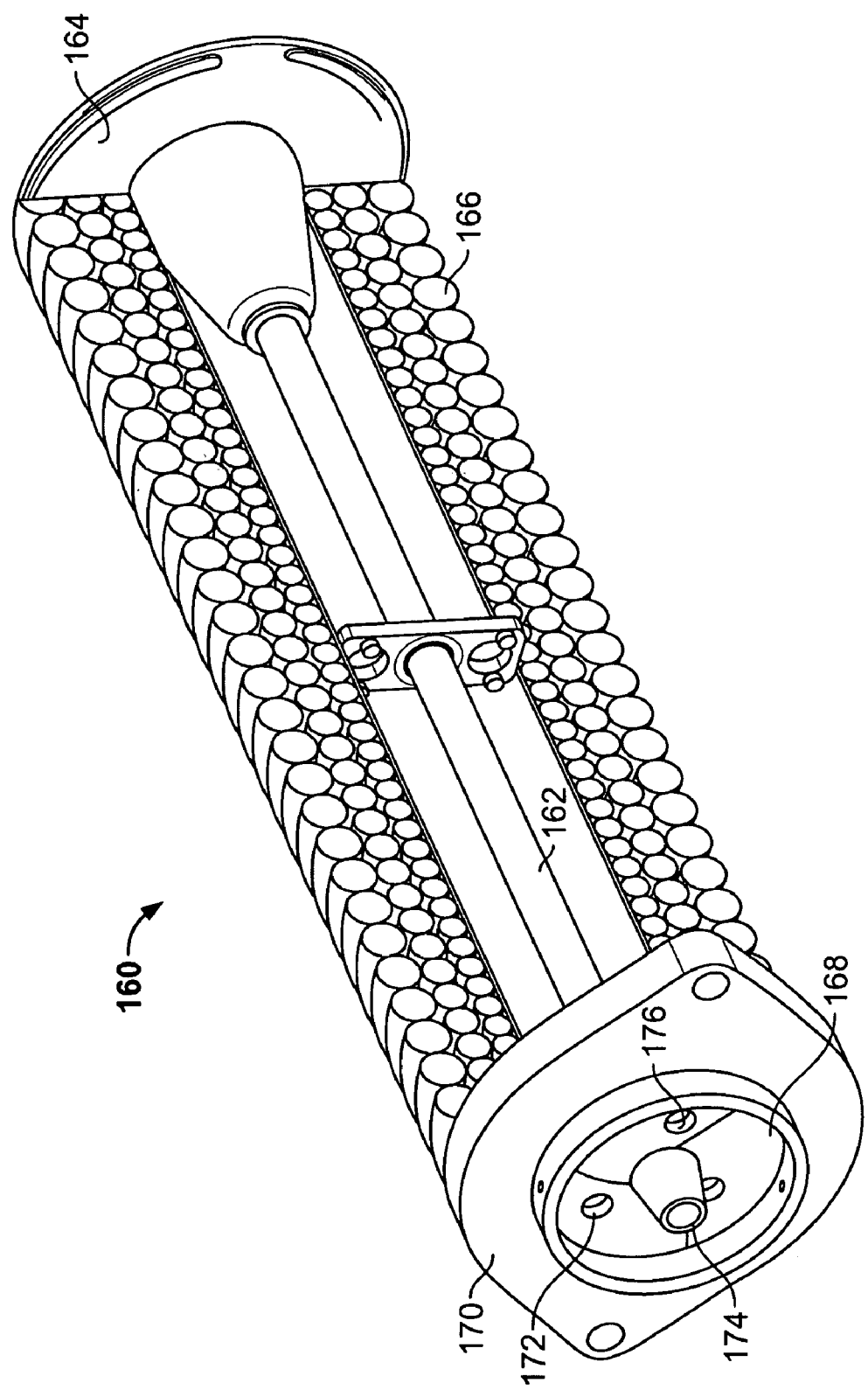
FIG. 12 is a perspective view of a spring assembly for use with the launcher of FIG. 10.

With reference to FIG. 12, motive force can be imparted to the shell using a spring assembly 160. The spring assembly can be used to thrust the shell out of the housing, or can be used in place of the shell. The spring assembly includes a central rod 162 attached to a first side wall 164 and disposed about a helical spring 166. To compress the spring, the rod extends through an opening 168 in a second side wall 170 and is held in place via wedges 172 spaced about the opening. The wedges hold an enlarged end 174 of the rod. A ring 176 is disposed around the outside of the wedges. When the ring is removed, the wedges rotate, releasing the center rod. The tether can be attached through two holes in an intermediate support connected to the central rod. The spring assembly can be scaled to suit the aircraft requirements.

With continued reference to FIGS. 11A-11F, launch sequence is initiated by first pressurizing the housing 156, via a pressurized gas or ignition of a combustible fuel, such that sufficient force is generated to accelerate the shell to a speed greater than the vehicle's minimum flight speed. Thereafter, the shell is ejected from the housing, following a ballistic trajectory while the elastic tether uncoils. Once the tether is fully tensioned, the UAV accelerates away from the launcher. Stretching of the tether delivers a gentle acceleration to the vehicle over a distance. As the UAV picks up energy, the shell loses energy, decelerates, and the tether slackens. Once the tether is slackened, it detaches from the vehicle with generous separation between the vehicle and shell trajectories. The resulting acceleration of the UAV is typically one-tenth of that required if the UAV were accelerated directly.

It should be appreciated from the foregoing that the present invention provides an unmanned aerial vehicle (UAV) that is cost effective to use and manufacture, to include a low count of component parts, allowing mission planners to use the UAVs in a disposable manner. In an exemplary embodiment, the UAV includes an airframe having a central body and wings extending from the central body, defining an interior cavity. The airframe includes an upper and a lower shell, each configured of a unitary piece of plastic. The upper and lower shells have walls among them that define a fuel tank and a payload bay in a stacked configuration within the interior cavity of the airframe. The airframe can further include a payload cover configured to enclose the payload bay and to contribute to the central body of the airframe. A launch assembly is also provided. In a first configuration, a launch assembly is provided, that includes a container for housing multiple UAVs and a deployment mechanism that initiates rapid ejection of the UAVs from the container. In a second configuration, a launch assembly is provided, that includes an elastic tether connecting a UAV to an accelerated mass for gentle acceleration to flight speed under a stable tow.

Although the invention has been disclosed in detail with reference only to the exemplary embodiments, those skilled in the art will appreciate that various other embodiments can be provided without departing from the scope of the invention. Accordingly, the invention is defined only by the claims set forth below.

We claim:

1. A launch system for unmanned aerial vehicles (UAVs), the system comprising:
   a container body having an opening and a removable lid configured to cover the opening, the container body having a length and a width;
   alignment supports disposed in the container body, the supports configured to secure a plurality of UAVs within the container in a prescribed orientation such that each UAV is disposed substantially perpendicular to the length of the container body; and
   a deployment mechanism configured to eject the UAVs through the opening of the container, the deployment mechanism comprising:
   a mass configured to be accelerated independent of the UAV; and
   an elastic tether configured to connect the UAV to the mass;
   wherein the mass is sufficiently sized relative to the UAV, and a force is imparted to the mass such that the elastic tether is stretched and sufficient force is imparted to the UAV to accelerate the UAV to flight speed;
   wherein the mass is configured to be accelerated via a spring assembly; and
   wherein the spring assembly serves as the mass, the spring assembly including
   a helical spring sufficiently sized to accelerate the UAV to flight speed;
   a first and second side walls disposed on opposing ends of the spring, the second side wall having an opening; and
   a central rod attached to the first side wall and releasably attached to second side wall through the opening thereof, rod configured to release spring tension upon release from the second side wall.

2. A launch system for an unmanned aerial vehicle (UAV, the system comprising:
   a mass configured to be accelerated independent of the UAV; and
   an elastic tether configured to connect the UAV to the mass;
   wherein the mass is sufficiently sized relative to the UAV, and a force is imparted to the mass such that the elastic tether is stretched and sufficient force is imparted to the UAV to accelerate the UAV to flight speed;
   wherein the mass is configured to be accelerated via a spring assembly; and
   wherein the spring assembly serves as the mass, the spring assembly including
   a helical spring sufficiently sized to accelerate the UAV to flight speed;
   a first and second side walls disposed on opposing ends of the spring, the second side wall having an opening; and
   a central rod attached to the first side wall and releasably attached to second side wall through the opening thereof, rod configured to release spring tension upon release from the second side wall.

* * * * *